US006200160B1

(12) United States Patent
Drexler et al.

(10) Patent No.: US 6,200,160 B1
(45) Date of Patent: Mar. 13, 2001

(54) PROTECTIVE CONSOLE UNIT FOR ELECTRICAL OR OPTICAL CONNECTORS

(75) Inventors: Leonard Hugh Drexler, Carmel; David Louis Reed, New Palestine, both of IN (US)

(73) Assignee: Avaya Technologies Corp., Miami Lakes, FL (US)

( * ) Notice: Subject to any disclaimer, the term of this patent is extended or adjusted under 35 U.S.C. 154(b) by 0 days.

(21) Appl. No.: 09/299,169

(22) Filed: Apr. 26, 1999

(51) Int. Cl.[7] ............................. H01R 13/60; H01R 13/66
(52) U.S. Cl. ............................................. 439/536
(58) Field of Search ................................. 439/536, 535, 439/538, 954, 133, 144; 174/66, 136, 144

(56) References Cited

U.S. PATENT DOCUMENTS

| 3,813,640 | 5/1974 | Carissimi . | |
|---|---|---|---|
| 4,603,931 | * 8/1986 | Ruffman | ................................. 339/37 |
| 5,096,439 | 3/1992 | Arnett . | |
| 5,302,140 | 4/1994 | Arnett . | |
| 5,362,254 | 11/1994 | Siemon et al. . | |
| 5,419,721 | 5/1995 | Lignelet . | |
| 5,897,395 | * 4/1999 | Arnett | ................................. 439/536 |
| 5,899,761 | * 5/1999 | Crane et al. | ........................ 439/142 |
| 6,051,786 | * 4/2000 | Gretz | ....................................... 174/57 |

OTHER PUBLICATIONS

Lucent Technologies Inc., on–line catalog SYSTIMAX Series MGS200 Series GigaSPEED Information Outlet Product Review Sheets, 2 pages.
Lucent Technologies Inc., on–line catalog SYSTIMAX Series MPS 100E Modular Information Outlet Product Review sheets, 2 pages.

* cited by examiner

*Primary Examiner*—Brian Sircus
*Assistant Examiner*—Chandrika Prasad
(74) *Attorney, Agent, or Firm*—Law Office of Leo Zucker

(57) ABSTRACT

A faceplate or console unit for electrical or fiber optic cable connectors. The unit has a base wall with at least one connector opening for mounting a first connector in the opening so that, when mounted, the first connector is accessible to an outside mating connector. A protective hood surrounds a portion of the base wall. The hood extends a determined height above the base wall, and the first connector can be accessed by a mating connector from a direction that is clear of the hood. The hood is arranged to prevent objects near the unit from striking the outside connector and thus causing its connection with the first connector to be interrupted.

12 Claims, 4 Drawing Sheets

PROTECTIVE CONSOLE UNIT FOR ELECTRICAL OR OPTICAL CONNECTORS

BACKGROUND OF THE INVENTION

1. Field of the Invention

This invention relates generally to faceplate panels for mounting electrical or optical connectors.

2. Description of the Known Art

Connector panels in the form of faceplates for mounting wire or fiber optic cable connectors, are generally known. See, for example, U.S. Pat. No. 5,096,439 (Mar. 17, 1992) which discloses a wall plate having jack-release slots in side walls of an opening in the plate, so that a jack connector mounted in the opening can be released by inserting a tool in the slots.

Faceplates are also known in which connectors can be mounted to face at an angle of, e.g., 45 degrees with respect to the normal direction of the faceplate. For example, see U.S. Pat. No. 5,897,395 issued Apr. 27, 1999, entitled "Multi-Position Jack Frame", and assigned to the assignee of the present application and invention. See also U.S. Pat. Nos. 5,362,254 (Nov. 8, 1994), and 3,813,640 (May 28, 1974); and U.S. patent application Ser. No. 08/534,218 filed Sep. 26, 1995, entitled "Flush Mounted Outlet", which is also assigned to the assignee of the present application and invention.

When the known face plates panels are mounted flush with a surrounding surface, and outside connectors are mated to corresponding connectors mounted in the panels, the outside connectors are typically in a position where they can be struck by objects which pass near the mounted faceplates. Such objects may cause the outside connectors to interrupt their connection with the associated mounted connectors, or, worse, to break apart irreparably. Environments where this condition is exacerbated include, but are not limited to, college computer laboratories where data jack panels are typically mounted at desktop height. Outside plug connectors engaging jacks mounted in the panels are known to be struck frequently by student books and book bags.

Accordingly, there is a need for a unit capable of mounting electrical or fiber optic connectors so that the connectors are readily accessible to outside mating connectors, and the mated outside connectors are physically protected from nearby objects. Such a connector mounting unit should also be compatible with existing cable raceways, with minimal work needed for installation of the mounting unit in situ.

SUMMARY OF THE INVENTION

According to the invention, a connector console unit includes a base wall having at least one connector opening dimensioned and arranged for mounting a first connector within the opening so that, when mounted, the first connector is accessible to an outside connector. A protective hood or wall surrounds a portion of the perimeter of the base wall, wherein the protective wall extends a determined height above the base wall. When mounted in the connector opening, the first connector is accessible to the mating connector from a direction that is clear of the protective wall, and the protective wall is formed and arranged to prevent objects near the console unit from striking the outside connector when mated to the first connector.

In one embodiment, the base wall has, e.g., four connector positions or openings aligned with one another in a row, and a mounting portion of the base wall in which the connector openings are formed is inclined at an angle (e.g., 45 degrees) with respect to the surrounding portion of the base wall, thus reducing the need for bending of approaching wires or cables associated with mating connectors.

According to another aspect of the invention, a unitary faceplate for communication connectors includes a faceplate body defining a base surface having a front side and a rear side, and the base surface forms a connector mounting portion. The connector mounting portion has a number of openings that extend between the front and the rear sides of the base surface, and each opening is formed to support a connector disposed at the rear side of the base surface. The faceplate body forms a protective hood that extends around a portion of the front side of the base surface, and the hood projects in a direction that is approximately perpendicular to the base surface.

The connector mounting portion may be generally recessed to define an acute angle with respect to a surrounding region of the base surface, so that a connector supported in an opening in the mounting portion is accessible for connection to a mating connector aligned at the front side of the base surface at a corresponding angle with respect to the base surface.

For a better understanding of the invention, reference is made to the following description taken in conjunction with the accompanying drawing and the appended claims.

DETAILED DESCRIPTION OF THE INVENTION

Figure 1:
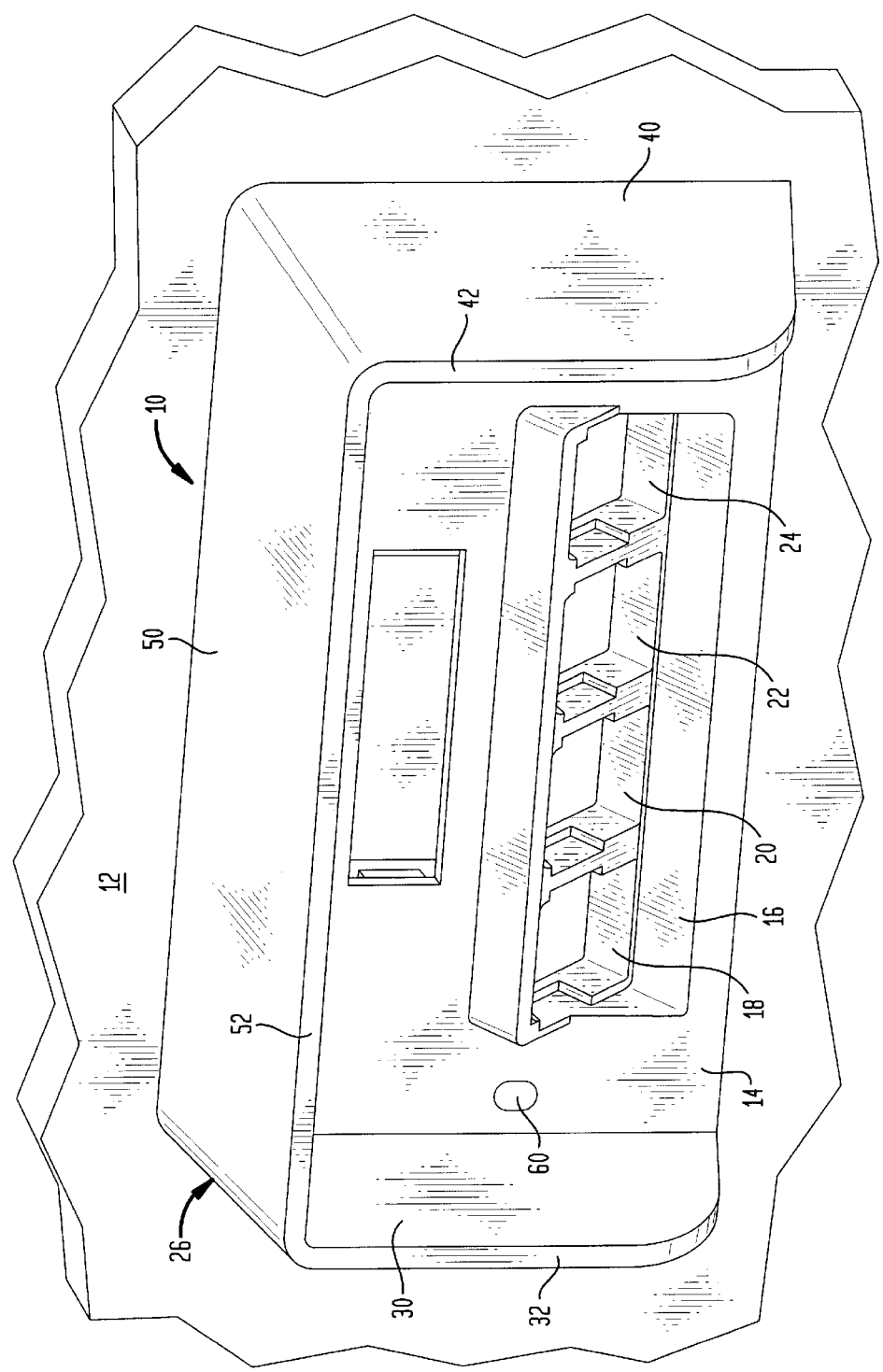
FIG. 1 is a perspective view of a connector console or faceplate unit according to the invention, when mounted on a vertical wall surface.

FIG. 1 is a perspective view of a connector console or faceplate unit 10, according to the invention. In the drawing, the unit 10 is shown mounted on a vertical wall 12. The wall 12 may be part of a raceway enclosing wires or cables that are to be terminated at the unit 10. The unit 10 may also be mounted horizontally or in other orientations, as desired.

The console unit 10 can be injection molded as a unitary, integral body from dielectric insulative materials such as, for example, a blend of polycarbonate and ABS. The material of which the unit 10 is formed should meet all applicable standards with respect to electrical insulation resistance and flammability, in view of the environment in which the unit is to be used.

In the illustrated embodiment, the body of the unit 10 forms a generally rectangular base surface or wall 14, and a connector mounting portion 16 is formed to be generally recessed beneath a front side of the base wall 14 as viewed in FIG. 1. The connector mounting portion 16 has, for example, four connector positions or openings 18, 20, 22, 24 in which connectors, for example, communication wire jacks can be supported at a rear side of the base wall 14 for access to mate with outside connectors on cables that approach the unit 10 at the front side of the base wall. See FIG. 3. A different number of connector positions, for example, two, three or six may be formed in the connector mounting portion 16, depending on the intended application for the unit 10.

The connector openings 18, 20, 22, 24 are aligned with one another along a common row. And, as shown in FIG. 1, the connector mounting portion 16 of the base wall 14 may be inclined at an acute angle (e.g., 45 degrees) with respect to the surrounding region of the base wall 14. Such an inclination of the connector mounting portion 16 may be desirable to allow connectors mounted at the rear side of the base wall, to connect with outside mating connectors aligned at the front side at an angle less than 90 degrees with respect to the base wall 14. Thus, connecting cables terminated with the mating connectors can approach the unit 10 without bending the cables excessively in the vicinity of the base wall 14.

Each of the connector openings is formed and sized to mount a typical connector; for example, series MPS100E or series MGS200 modular communication jack connectors available from Lucent Technologies Inc. Other connectors whose mounting requirements can be accommodated by forming corresponding connector positions or openings in the connector mounting portion 16, may also be used.

Although the connector mounting portion 16 is shown recessed and inclined with respect to the surrounding surface of the base wall 14 in FIG. 1, the mounting portion 16 may also be substantially flush or parallel to the surrounding surface of the base wall. In the latter case, connectors such as the mentioned MPS100E and MGS200 series, which themselves are capable of mounting either flush or at a 45-degree inclination relative to a supporting surface, can then be used to allow either a flush or a 45-degree connector orientation to be selected.

A protective wall or hood 26 surrounds a portion of the perimeter of the base wall. The protective wall 26 serves to prevent objects that are near or moving toward the console unit 10, from striking outside cable connectors when the latter are mated to connectors mounted in the unit 10.

In the disclosed embodiment, the protective wall 26 forms a first side wall 30 that is joined to the base wall at a first side (i.e., left side as viewed in FIGS. 1 and 3) of the connector openings 18, 20, 22, 24. As seen in the drawing, the first side wall 30 extends generally perpendicular to the base wall 14, and has an upper edge 32 at a certain height H (FIG. 3) above the base wall 14. For example, the height H of the side wall 30 corresponds at least to the height of a mating connector 34 above the front side of the base wall 14, as seen in FIG. 3.

Figure 3:
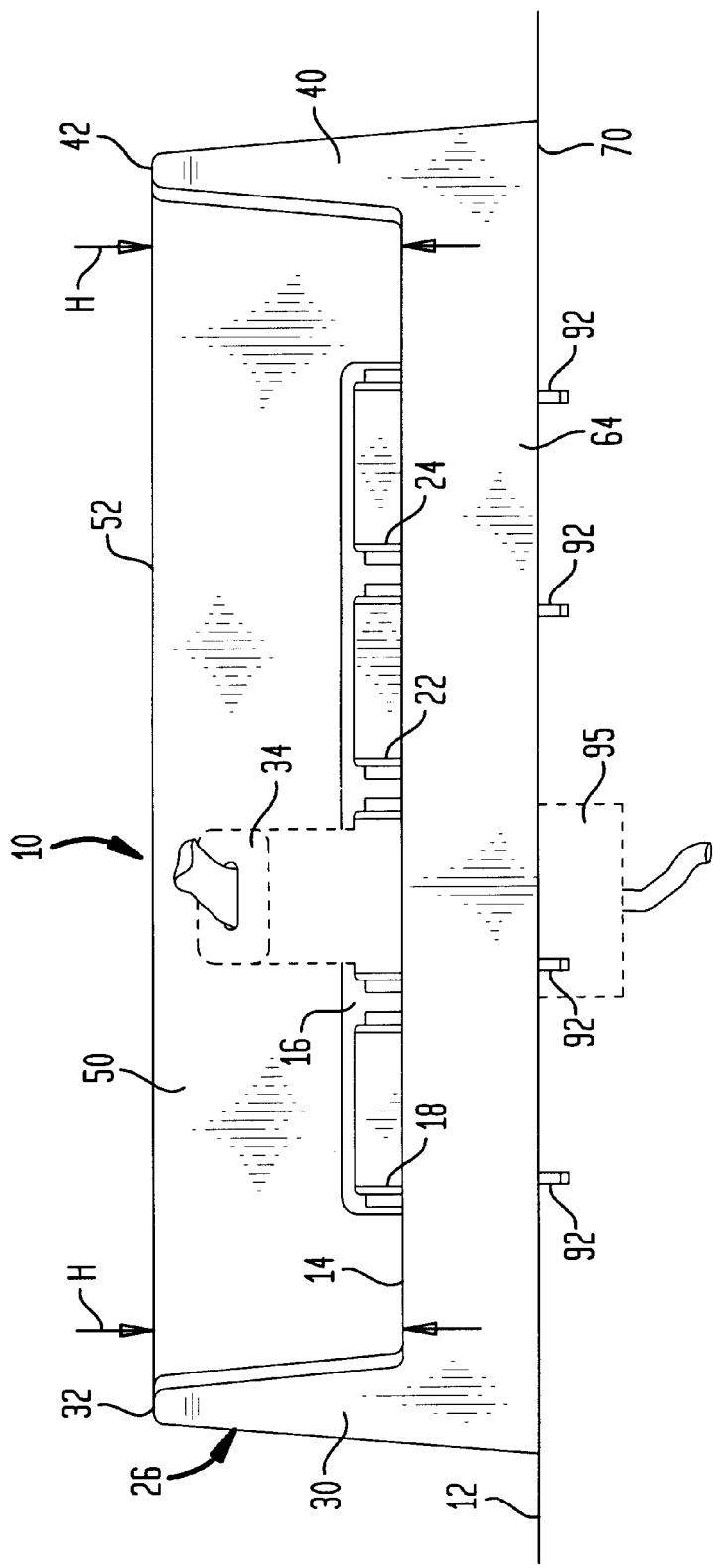
FIG. 3 is a front side view of the console unit, showing part of a connector mounted at one position on the unit, and an outside connector mated to the mounted connector.

The protective wall 26 also forms a second side wall 40 that is joined to the base wall 14 at a second side (i.e., right side as seen in FIGS. 1 and 3) of the connector openings 18, 20, 22, 24; opposite the first side. The second side wall 40 is generally parallel to the first side wall 30, and the wall 40 has an upper edge 42 at the mentioned height H above the base wall 14.

Further, the protective wall 26 also forms a top wall 50 that is joined to the base wall 14 and to the two side walls 30, 40. The top wall 50 extends generally perpendicular to the base wall 14 and to the two side walls 30, 40. In the present embodiment, the top wall 50 has an upper edge 52 that coincides with the upper edges 32, 42 of the side walls 30, 40, so that the upper edge 52 is also at the height H above the base wall 14. A pair of mounting holes 60, 62 are formed through the base wall 14 for receiving and guiding mounting screws or other fasteners to secure the unit 10 on the wall 12, or to some other mounting surface. See FIGS. 1 and 2.

Figure 2:
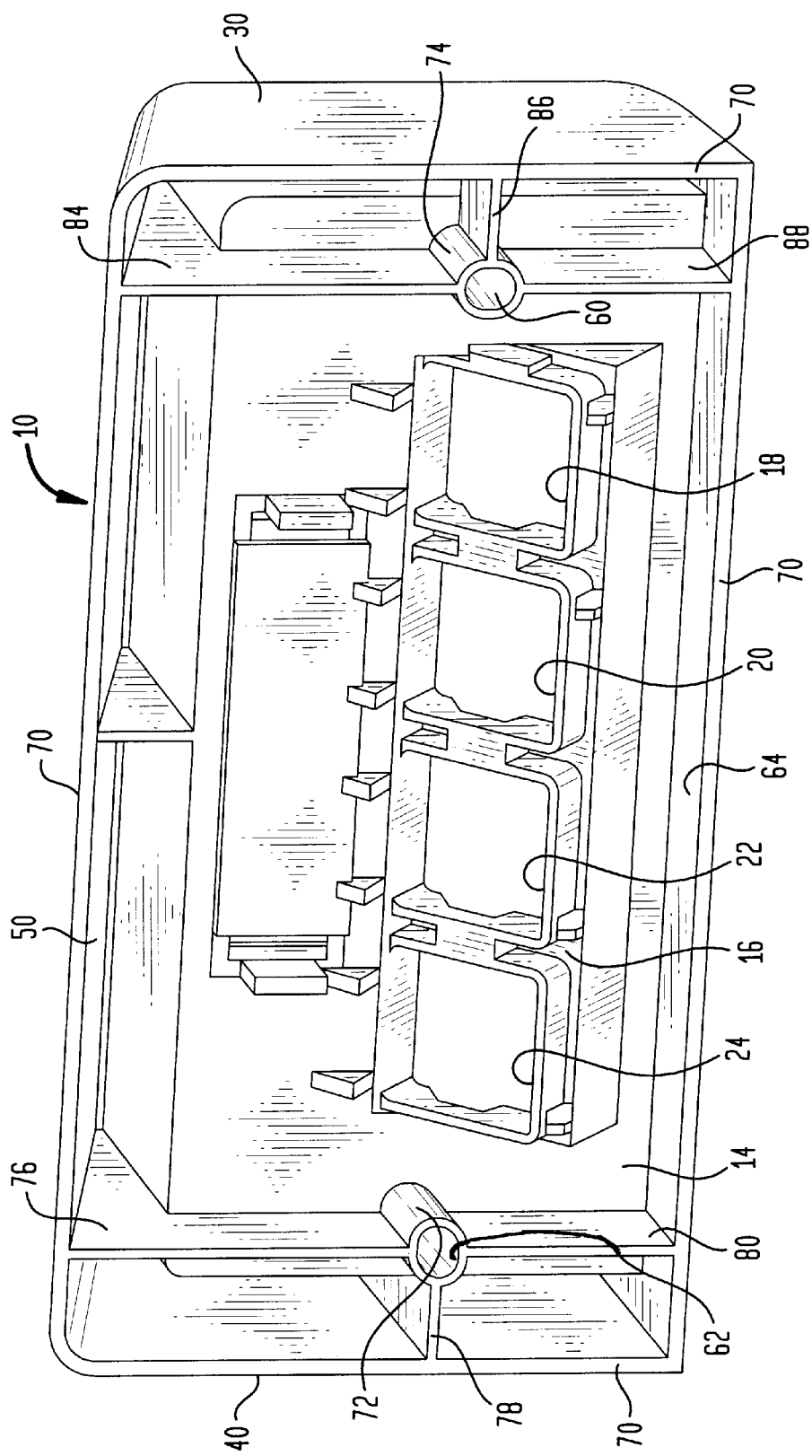
FIG. 2 is a perspective view of the console unit looking from behind the unit.

FIG. 2 is a view of the unit 10 as seen from behind the unit. The protective hood or wall 26 and a lower front panel 64 (see also FIG. 3) together form a generally rectangular bottom edge 70. The bottom edge 70 is dimensioned and arranged to seat flush with a mounting surface (e.g., the wall 12) on which the unit 10 will be mounted.

As seen in FIG. 2, the mounting holes 60, 62 are formed axially in corresponding bosses 72, 74 that project from the rear side of the base wall 14. The bosses extend to a position that substantially coincides with a plane containing the bottom edge 70 of the unit 10. A first, flat load-bearing rib 76 is joined at one side edge to the periphery of the boss 72 along the axial direction, as see at the left in FIG. 2. The rib 76 is substantially parallel to the second side wall 40, and an opposite side edge of the rib 76 is joined to the top wall 50. A second, flat rib 78 which is substantially perpendicular to the second side wall 40, joins the circumference of boss 72 with the second side wall. A third, flat rib 80 substantially parallel to the second side wall, joins the boss 72 with the lower front panel 64 of the unit 10.

Likewise, a fourth, flat load bearing rib 84 which is substantially parallel to the first side wall 30, joins the periphery of boss 74 with the top wall 50, as seen at the right in FIG. 2. A fifth, flat rib 86 substantially perpendicular to the first side wall 30, joins the circumference of the boss 74 with the first side wall 30. A sixth, flat rib 88 substantially parallel to the first side wall, joins the boss 74 with the lower front panel 64 of the unit 10.

Bottom edges of the ribs 76, 78, 80, 84, 86 and 88, which edges face out of the drawing in FIG. 2, substantially coincide with the plane of the bottom edge 70 of the console unit. Thus, the ribs function to transfer loads exerted by mounting screws on the bosses 72, 74, to those portions of the bottom edge 70 that seat flush with the surface on which the unit 10 is to be mounted.

Figure 4:
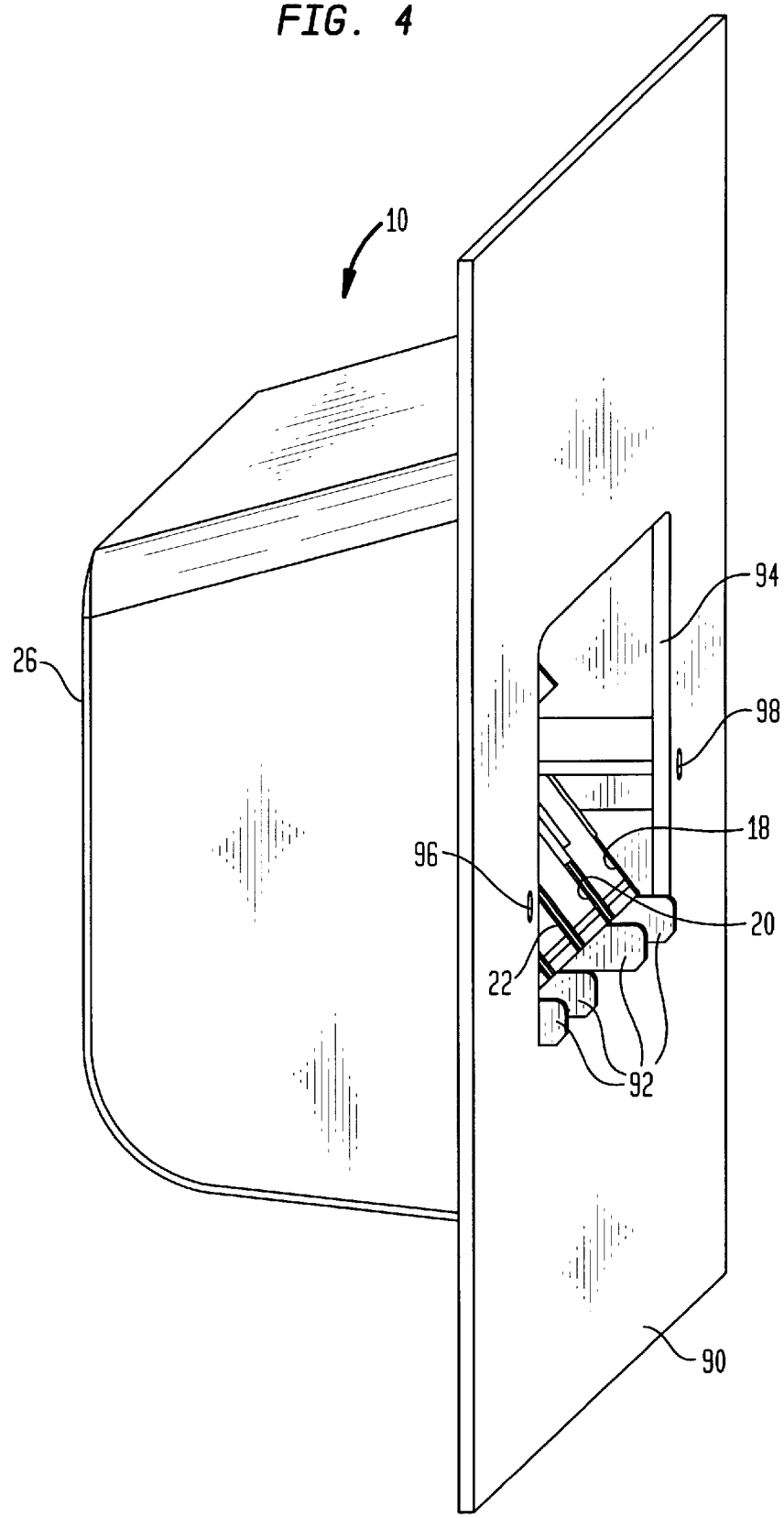
FIG. 4 is a perspective view of the console unit mounted vertically on part of a cable raceway wall, as seen from behind the unit.

FIG. 4 is a view of the console or faceplate unit 10 as seen from behind, with the unit mounted vertically on part of a cable raceway wall 90. In the illustrated embodiment, a set of four locating tabs 92 project from the rear side of the base wall 14. A generally rectangular opening 94 is cut in the wall 14 at a position where the unit 10 is to be seated. The wall opening 94 is large enough to allow mounted connectors such as connector 95 in FIG. 3, whose bodies project beyond the bottom edge 70 of the unit 10, to clear side edges of the opening 94 when the unit 10 is placed over the opening 94 and the locating tabs 92 abut a lower edge of the opening 94. Electrical wire or fiber optic cables that run in a raceway on the side of the wall 90 shown in FIG. 4, can pass through the wall opening 94 and terminate with one or more connectors, e.g., communication jacks, that are mounted at corresponding positions at the rear side of the mounting portion 16.

The locating tabs 92 also serve to transfer impact loads on the unit 10 safely to the raceway wall 90, rather than allowing such loads to be transferred only by fasteners that secure the unit 10 to the wall 90. For example, with the unit 10 secured to the raceway wall 90 as in FIG. 4, if the unit 10 is inadvertently struck at the top by a book or book bag, the locating tabs 92 will transfer the impact force evenly along a bottom edge of the raceway opening 94. Downward movement of the unit 10 with respect to the wall 90 is restrained as a result.

A pair of fastener openings 96, 98 are formed in the raceway wall 90, near opposite side edges of the wall opening 94. The fastener openings 96, 98 are located so that the mounting holes 60, 62 in the bosses 72, 74 will register with the fastener openings when the locating tabs 92 abut the lower edge of the raceway wall opening 94. The fastener openings 96, 98 may be threaded to engage corresponding threaded fastener screws that are used to mount the unit 10 on the raceway wall 90.

While the foregoing description represents a preferred embodiment of the invention, it will be obvious to those skilled in the art that various changes and modifications may be made, without departing from the true spirit and scope of the invention pointed out by the following claims.

We claim:

1. A unitary connector console unit that can be mounted over a cable opening in a mounting surface, the console unit comprising:

a generally rectangular base wall having a front side and a rear side, the base wall forming a connector mounting portion having at least one connector position dimensioned and arranged so that a first connector can be supported at the one position and be accessible to an outside connector at the front side of the base wall;

a protective wall extending from a portion of the perimeter of the base wall to a determined height above the base wall, so that the first connector will be accessible to the outside connector from a direction that is clear of the protective wall;

wherein said protective wall is formed and arranged to prevent objects near the console unit from striking the outside connector when mated to the first connector;

the protective wall includes a first side wall that is joined to a first side of the base wall, a second side wall that is joined to a second side of the base wall opposite the first side, and a top wall that extends normally to the base wall between the first and the second side walls; and one or more locating members projecting from the rear side of the base wall for engaging an edge of the cable opening in the mounting surface on which the console unit is to be mounted.

2. A console unit according to claim 1, wherein the protective wall has an upper edge at a height above said base wall which height is at least equal to that of an outside connector when mated to a connector supported at a connector position in the connector mounting portion of the base wall.

3. A console unit according to claim 1, wherein the heights of said first and said second side walls and said top wall, are at least equal to that of an outside connector when mated to a connector supported at a connector position in the connector mounting portion of the base wall.

4. A console unit according to claim 1, wherein said connector mounting portion is inclined with respect to a surrounding region of the base wall.

5. A console unit according to claim 4, wherein said connector mounting portion is inclined at an angle of about 45 degrees with respect to said surrounding region.

6. A console unit according to claim 1, wherein the locating tabs are constructed and arranged to transfer impact loads on said unit to said mounting surface.

7. A unitary faceplate for communication connectors that is mountable over a cable opening in a mounting surface, the faceplate comprising:

a faceplate body defining a generally rectangular base surface having a front side and a rear side, and the base surface forms a connector mounting portion;

said connector mounting portion forming a plurality of connector positions, wherein each position is formed to support a first connector for access by an outside connector at the front side of the base surface;

the faceplate body forms a protective hood that extends around a portion of the front side of the base surface, and said hood projects in a direction that is approximately perpendicular to the base surface to prevent objects near the faceplate from striking the outside connector when mated to the first connector;

the protective hood includes a first side wall that is joined to a first side of the base surface, a second side wall that is joined to a second side wall of the base surface opposite the first side, and a top wall that extends normally to the base surface between the first and the second side walls; and one or more locating members projecting from the rear side of said base surface for engaging an edge of the cable opening in the mounting surface on which the faceplate is to be mounted.

8. A faceplate according to claim 7, wherein the connector mounting portion is generally recessed in said base surface and defines an acute angle with respect to a surrounding region of the base surface, so that a connector mounted at the rear side of said mounting portion is accessible for connection to a connector aligned at the front side of the mounting portion at an angle less than 90 degrees with respect to the base surface of the faceplate.

9. A faceplate according to claim 7, wherein the protective hood has an upper edge at a height above said base surface which height is at least equal to that of an outside connector when mated to a connector mounted at the connector mounting portion of the base surface.

10. A faceplate according to claim 7, wherein the heights of said first and said second side walls and said top wall, are at least equal to that of an outside connector when mated to a connector mounted at the connector mounting portion of the base surface.

11. A faceplate according to claim 8, wherein said connector mounting portion is inclined at an angle of about 45 degrees with respect to the surrounding region of the base surface.

12. A faceplate according to claim 7, wherein the locating tabs are constructed and arranged to transfer impact loads on said unit to said mounting surface.

\* \* \* \* \*